United States Patent [19]

Kanetaka et al.

[11] 3,890,361
[45] June 17, 1975

[54] PRODUCTION OF GAMMA-BUTYROLACTONE

[75] Inventors: Junichi Kanetaka; Shoichiro Mori, both of Ami-machi; Itaru Kobayashi, Tokyo, all of Japan

[73] Assignee: Mitsubishi Petrochemical Company, Ltd., Japan

[22] Filed: Aug. 30, 1972

[21] Appl. No.: 284,988

[30] Foreign Application Priority Data
Sept. 25, 1971 Japan.......................... 46-74940

[52] U.S. Cl..... 260/343.6; 260/346.1 R; 260/537 R
[51] Int. Cl............................................. C07d 5/06
[58] Field of Search...................... 260/343.6, 346.1

[56] References Cited
UNITED STATES PATENTS

| | | | |
|---|---|---|---|
| 2,116,552 | 5/1938 | Arnold et al.......................... | 252/470 |
| 2,584,531 | 2/1952 | Arnold et al.......................... | 252/470 |
| 2,772,291 | 11/1956 | McShane et al.................. | 260/343.6 |
| 2,772,293 | 11/1956 | Gilbert et al...................... | 260/343.6 |
| 3,492,314 | 1/1970 | Asano et al....................... | 260/343.6 |

*Primary Examiner*—Donald G. Daus
*Assistant Examiner*—Anne Marie T. Tighe
*Attorney, Agent, or Firm*—Wenderoth, Lind & Ponack

[57] ABSTRACT

An aliphatic gamma-dicarboxylic compound which is a precursor for hydrogenation into a corresponding gamma-butyrolactone is caused to contact hydrogen in the presence of a hydrogenation catalyst prepared by intimately combining nickel, molybdenum, barium and/or thallium thereby to produce the gamma-butyrolactone. The addition of barium and/or thallium is original and highly advantageous in that the resulting hydrogenation catalyst has high effectiveness in the production of gamma-butyrolactones and has a long serviceable life, being acid resistant.

6 Claims, No Drawings

PRODUCTION OF GAMMA-BUTYROLACTONE

BACKGROUND OF THE INVENTION

This invention relates generally to the production principally of gamma-butyrolactones by catalytic hydrogenation of dicarboxylic anhydrides such as maleic anhydride and succinic anhydride and of other aliphatic gamma-dicarboxylic compounds. More specifically, the invention relates to a new and advanced nickel catalyst for use in this catalytic hydrogenation.

Certain processes for producing gamma-butyrolactone by catalytic hydrogenation of dicarboxylic anhydrides and diesters as mentioned above are known through disclosures set forth in the specifications of U.S. Pat. No. 3,065,243, U.S. Pat. No. 3,113,138, Japanese Pat. Publication Nos. 17818/1967, 17259/1967, 14463/1968, 5391/1968, and others. The catalysts used in these processes except that specified in U.S. Pat. No. 3,214,385 are copper-chromite catalysts of the Adkins type, improvements thereof, or modifications thereof. A palladium catalyst is specified in U.S. Pat. No. 3,214,385.

While these known catalysts are valuable in the sense that they present respectively significant contributions to the art, they all tend to have a short serviceable life because of rapid lowering of their catalytic activity with use, to the best of our knowledge. More specifically, the metals and metal oxides constituting these catalysts are severely attacked by the carboxylic acid produced as a by-product during the reaction.

We have previously proposed a number of catalysts as being suitable for producing cyclic ethers and cyclic lactones by solving the problem of deterioration of catalytic activity arising in the hydrogenation of dicarboxylic anhydrides. One of these proposed catalysts is a catalyst system based on nickel and molybdenum. This catalyst has a structure wherein nickel and molybdenum constitute a solid solution and are intimately combined, and its resistance to acids is remarkably good. This catalyst is highly advantageous in the production of cyclic ether as the principal product, which has heretofore been considered to be difficult.

SUMMARY

This invention provides a mode of utilization of the above described catalyst previously proposed by us. In accordance with this invention, barium or thallium is added to the previously proposed catalyst, whereby there is obtained a new catalyst which is particularly effective in the production of gamma-butyrolactone, which is an intermediate product to tetrahydrofuran.

According to this invention, briefly summarized, there is provided a process for producing gamma-butyrolactone which is characterized in that an aliphatic gamma-dicarboxylic compound constituting a precursor material for hydrogenation into gamma-butyrolactone is brought into contact with hydrogen in the presence of a hydrogenation catalyst prepared by intimately combining (1) nickel, (2) molybdenum, and (3) at least one element selected from the group consisting of barium and thallium.

Thus, according to this invention, barium is added to the previous proposed nickel-molybdenum catalyst system, but this does not impair or nullify the acid resistance exhibited by the nickel-molybdenum system. Accordingly, this invention has succeeded in providing an improved catalyst which is highly suitable for use in the production of gamma-butyrolactone which can otherwise be further hydrogenated to tetrahydrofuran while retaining the desirable acid resistance of the previous nickel-molybdenum catalyst by adding barium and/or thallium to this previous catalyst system, by which preivous catalyst system it has become possible through improved acid resistance to produce even tetrahydrofuran.

It may be considered that in the catalyst according to this invention, the nickel and the molybdenum form a solid solution and become a catalyst skelton, and the barium and/or thallium act as a kind of poison on such active sites as to cause the hydrogenation to proceed even to tetrahydrofuran to render the catalyst into a system highly suitable for the production of gamma-butyrolactone.

The nature, utility, and further features of this invention will be apparent from the following detailed description beginning with a consideration of general aspects of the invention and concluding with specific examples of practice illustrating preferred embodiments thereof.

DETAILED DESCRIPTION

Catalyst

While the catalyst of this invention can be prepared by any of various methods, including those with or without a carrier, preparation of the catalyst in a form wherein it is carried on a carrier as described below is preferable.

This catalyst preparation method is characterized in that a nickel compound which decomposes to produce metallic nickel upon being heated in a reducing atmosphere, a molybdenum compound which decomposes to produce metallic molybdenum or a molybdenum oxide upon being heated in a reducing atmosphere, and a barium compound or a thallium compound which decomposes upon being heated in a reducing atmosphere to produce metallic berium or metallic thallium or a barium oxide or a thallium oxide are intimately combined on a carrier, and the resulting aggregate material is heated in a reducing atmosphere.

While this method can be practiced in a variety of modes, it is preferably accomplished by a process which comprises a solution impregnation step in order to cause intimate combining of the above named three kinds of compounds. More specifically, it is preferable to introduce the compounds to be combined, themselves, their precursors, or their derivatives onto a carrier in the form of a solution, particularly an aqueous solution.

For this purpose, any suitable method such as the following can be used. In one suitable method, separate solutions respectively of the three of compounds are caused to impregnate the carrier, or a mixture solution thereof is caused to impregnate the carrier. In another method, these compounds are caused by a precipitant to precipitate simultaneously from a solution. In still another method, one or two of compounds of the three kinds of compounds are first caused to precipitate, and thereafter, the remaining component in caused to impregnate the carrier.

Examples of specific processes by which these methods can be practiced are as follows. In one process, compounds of nickel, molybdenum, barium and/or thallium in the form of soluble salts are applied in the state of aqueous solutions and caused to impregnate the carrier. In another process, a carrier-provided nickel salt is prepared by dropping a precipitant into an aqueous solution of a nickel compound in which a carrier has been dispersed thereby to deposit a nickel component on the carrier and drying the nickel salt thus obtained, and then impregnating this carrier-provided nickel salt with soluble compounds of molybdenum, barium, and/or thallium in the state of an aqueous solution. A third process comprises preparing a nickel salt cake from a nickel compound by using a precipitant, kneading into this nickel salt cake compounds of molybdenum, barium, and/or thallium in the state of as aqueous solution, and causing the resulting material to adhere by kneading on a carrier.

Examples of nickel compounds suitable for use in these processes are nickel nitrate, nickel sulfate, nickel chloride, and various organic salts of nickel. Examples of suitable precipitants are ammonium carbonate, ammonium bicarbonate, sodium carbonate, and sodium hydroxide. An example of a suitable molybdenum compound is ammonium molybdate. While, for the compounds of barium and thallium, nitrates thereof are preferable, chlorides, carbonates, and organic acid salts thereof can also be used.

The catalyst of this invention can be produced, in general, by first thoroughly drying a mixture prepared in accordance with any of the above described modes and containing compounds of nickel, molybdenum, barium, and/or thallium and a carrier and then reducing this mixture in a reducing atmosphere at a temperature of from 350° to 800°C, preferably from 400° to 600°C, for several hours.

Depending on the necessity, it is additionally possible to render the catalyst into a desired shape by adding a suitable binder in one of the steps of the above described process.

A catalyst produced in this manner has the property of igniting upon suddenly contacting air. Accordingly, it is also possible to render this catalyst into a form convenient for handling by treating it with carbon dioxide gas or air diluted with an inert gas.

We have found that a catalyst according to this invention of a composition as specified below in terms of atomic ratios is highly effective. The molybdenum-to-nickel atomic ratio (Mo/Ni) is from 0.01 to 0.20, preferably from 0.04 to 0.15; while the barium- or thallium-to-nickel atomic ratio (Ba/Ni) or (Tl/Ni) is from 0.005 to 0.15, preferably from 0.02 to 0.10.

Hydrogenation of gamma-dicarboxylic compounds

A catalyst prepared in the above described manner is highly effective in the production of products of hydrogenation, particularly gamma-butyrolactone, from aliphatic gamma-dicarboxylic compounds, that is, gamma-dicarboxylic acid, and derivatives thereof such as anhydrides and monoesters and diesters thereof, particularly esters with aliphatic monohydric alcohols of from $C_1$ to $C_{10}$.

The basic or simplest aliphatic gamma-dicarboxylic acid is succinic acid. In accordance with this invention, aliphatic gamma-dicarboxylic acids other than succinic acid which become gamma-butyrolactone derivatives upon undergoing the reaction according to the invention are included, examples of such acids other than succinic acid being monomethyl and dimethyl succinic acids, maleic acid, monomethyl and dimethyl maleic acids, fumaric acid, and monomethyl and dimethyl fumaric acids.

Another group of aliphatic gamma-dicarboxylic compounds to be included in the practice of this invention are anhydrides of the above specified dicarboxylic acids, typical examples being succinic anhydride and maleic anhydride.

Still another group of aliphatic gamma-dicarboxylic compounds within the purview of this invention are monoesters and diesters of the above specified dicarboxylic acids. Examples of suitable compounds of this group are esters with aliphatic monohydric alcohol of the order of from $C_1$ to $C_{10}$, methylesters being typical examples.

These aliphatic gamma-dicarboxylic compounds are precursors of the gamma-butyrolactone to be produced by the hydrogenation reaction. Accordingly, a dicarboxylic compound to be actually used must be one which produces the objective gamma-butyrolactone as a result of the hydrogenation. Furthermore, from the point than these compounds are precursors for producting the objective gamma-butyrolactone as an ultimate result, it is evident that these dicarboxylic compounds can be mixtures.

Therefore, the starting dicarboxylic compound in the case where the most basic gamma-butyrolactone is to be produced in accordance with this invention is preferably succinic acid, succinic anhydride, maleic anhydride or one of mixtures thereof.

In accordance with this invention, the hydrogenation reaction is carried out ordinarily at a reaction temperature of from 180° to 300°C, preferably from 230° to 290°C. In the case where the reaction temperature is high, and the quantity of catalyst used is large, the reaction can be accomplished under a low pressure, but, in general, hydrogen pressure of from 30 to 200 atmospheres, preferably from 40 to 140 atmospheres, is used.

In general, the starting materials are caused to react by themselves at a reaction temperature above their melting points. Depending on the necessity, however, it is also possible to introduce these materials into the reaction by a measure such as the use of a suitable solvent or diluent, wherein gamma-butyrolactone which is the product, can be the solvent.

The reaction can be carried out by a batch process, a continuous process, a fixed catalyst bed process, or a non-fixed catalyst bed process. A preferable process, however, is that we have proposed, as disclosed in British Pat. No. 1,226,292, in which, in the catalytic hydrogenation of a dicarboxylic compound in the presence of a hydrogenation catalyst, the reaction product is taken out of the reaction region in a vapor phase together with an excessive quantity of hydrogen gas.

The process for producing products of hydrogenation as set forth in the specification of this British Pat. No. 1,226,292 is characterized in that, in the catalytic hydrogenation of a dicarboxylic compound in the presence of a hydrogenation catalyst thereby to produce a cyclic leactone compound or cylic ether compound which is the corresponding product of hydrogenation, the starting-material dicarboxylic compound is supplied in a liquid phase, namely in solution or in melt, into a reaction region which is in a liquid phase and is maintained at a substantially constant temperature, and the reaction product is taken out in a vapor phase together with excess hydrogen from the reaction region.

While this known process is particularly suitable for the production of tetrahydrofuran, which is a further hydrogenation product of gamma-butyrolactone, it can be advantageously used also in the practice of this invention if the ratio of the tetrahydrofuran formed relative to the gamma-butyrolactors (THF/gamma-BL) is caused to be small. More specifically, by increasing the supply quantity or excess of hydrogen gas and removing the resulting gamma-butyrolactone immediately out of the reaction region, or by causing the rate of distillation from the reaction region to be high, it becomes possible to produce products of hydrogenation comprising, principally, gamma-butyrolactone.

Products formed

Because of the characteristics of the Ni-Mo-Ba and/or Tl catalyst, the products formed comprise, principally, gamma-buryrolactone.

Depending on the reaction conditions, a small quantity of tetrahydrofuran is produced as a by-product in some cases, but such cases are also within the purview of practice of this invention provided that the gamma-butyrolactone constitutes a predominant proportion, for example, 90 percent by mole or higher, of the quantity of the products formed.

For a fuller indication of the nature and utility of this invention, the following specific examples of practice consituting preferred embodiments of the invention and results are set forth, it being understood that these examples are presented as illustrative only and that they are not intended to limit the scope of the invention.

Since an object of this invention is to produce gamma-butyrolactone, it can be judged in the following examples that this object is effectively achieved with increased value of the yield of gamma-butyrolactone in the case of a batch process, or the value of the rate of formation of gamma-butyrolactone in the case of continuous process according to the method of British Pat. No. 1,226,292 and, moreover, with decreased value of the ratio of the formed quantities of tetrahydrofuran and gamma-butyrolactone (THF/gamma-BL).

EXAMPLE 1.

To a basic nickel carbonate salt cake of yellow-green color precipitated by adding an aqueous solution of ammonium bicarbonate as a precipitant to an aqueous solution of nickel acetate, an aqueous solution of ammonium molybdate and an aqueous solution of barium nitrate in an amount necessary for giving each of the catalysts indicated in Table 1 were added, and the resulting mixture in each case was thoroughly kneaded to attain a uniform composition and thereby to prepare a mud-cake of a mixture of nickel, molybdenum, and barium.

To this cake, silica-alumina of an alumina content of 13 percent by weight and of a 60 to 80-mesh particle size was added in an amount to produce the weight ratio of nickel to the silica-alumina of 1 : 1. Then the resulting mixture was subjected simultaneously to kneading and evaporation to dryness as it was heated at a temperature of from 70° to 90°C. The resulting process material was further dried for 24 hours at a temperature of from 100° to 110°C, whereupon a powder was obtained.

This powder was subjected to decomposition of the metal compounds carried thereon in a stream of a gas mixture of hydrogen and nitrogen of a mixture ratio of 1 : 2 at a temperature of from 270 to 350°C and was then subjected to reduction for 3 hours in a stream of hydrogen at 450°C. The solid thus reduced with hydrogen was cooled to 150°C, and then the hydrogen stream in which it was disposed was changed over to a nitrogen stream. When this solid cooled to room temperature, it was stabilized by placing it gradually in contact with air diluted with nitrogen. In this manner, the catalysts Nos. 1 through 6 were prepared.

Each of these catalysts Nos. 1 through 6 was used in a quantity of 1 gram (g.) in a hydrogenation reaction wherein, by means of a 100-cc. autoclave with electromagnetic agitation, 40 g. of succinic anhydrice was contacted with hydrogen for 3 hours under the conditions of a reaction pressure of 120 kg/cm$^2$ and a reaction temperature of 260°C.

Upon completion of this reaction, gas chromatographic analysis of the products was carried out with diethyl ketone as an internal standard. The "succinic acid" in Table 1 may include some succinic anhydride to the gas chromatographic analysis, but it was verified as being succinic acid by nuclear magnetic resonance (NMR).

It should be noted that catalyst No. 1 is a nickel-molybdenum catalyst without the addition of barium and is included in Table 1 as an example for comparison. In Table 1 and the succeeding table, the abbreviation THF denotes tetrahydrofuran, gamma-BL denotes gamma-butyrolactone, and SA denotes succinic acid.

Table 1

| Catalyst No. | Catalyst composition (atomic ratio) | | Formed products (% by weight) | | | Product ratio THF/gamma-BL(Wt./Wt.) |
|---|---|---|---|---|---|---|
| | Mo/Ni | Ba/Ni | THF | gamma-BL | SA | |
| 1 | 0.06 | 0 | 8.7 | 60 | 10 | 0.145 |
| 2 | 0.06 | 0.01 | 8.1 | 62 | 6 | 0.130 |
| 3 | 0.06 | 0.02 | 6.6 | 63 | 11 | 0.104 |
| 4 | 0.06 | 0.03 | 5.6 | 66 | 5 | 0.085 |
| 5 | 0.06 | 0.06 | 3.8 | 63 | 13 | 0.061 |
| 6 | 0.06 | 0.10 | 3.3 | 63 | 13 | 0.053 |

EXAMPLE 2

Catalysts Nos. 7 through 11 were prepared in the same manner as specified in Example 1.

One gram of each of these catalysts was used in carrying out the reaction specified in Example 1 under the same conditions, whereupon the results set forth in Table 2 were obtained.

Table 2

| Catalyst No. | Catalyst composition (atomic ratio) | | Formed products (% by weight) | | | Product ratio THF/gamma-BL(Wt./Wt.) |
|---|---|---|---|---|---|---|
| | Mo/Ni | Ba/Ni | THF | gamma-BL | SA | |
| 7 | 0 | 0.06 | 1.2 | 47 | 41 | 0.026 |
| 8 | 0.01 | 0.06 | 4.3 | 60 | 15 | 0.072 |
| 9 | 0.03 | 0.06 | 5.3 | 62 | 10 | 0.087 |
| 10 | 0.10 | 0.06 | 4.0 | 63 | 12 | 0.063 |
| 11 | 0.15 | 0.06 | 4.0 | 65 | 7 | 0.061 |

EXAMPLE 3

Catalysts Nos. 12 through 15 as indicated in Table 3 were prepared in accordance with the procedure set forth in Example 1 except for the use of thallium nitrate instead of barium nitrate in the preparation of the catalysts.

One gram of each of these catalysts was used in carrying out the reaction specified in Example 1, whereupon the results set forth in Table 3 were obtained.

Table 3

| Catalyst No. | Catalyst composition (atomic ratio) | | Formed products (% by weight) | | | Product ratio THP/gamma-BL(Wt./Wt.) |
|---|---|---|---|---|---|---|
| | Mo/Ni | Tl/Ni | THF | gamma-BL | SA | |
| 12 | 0.06 | 0.01 | 7.9 | 66 | 10 | 0.120 |
| 13 | 0.06 | 0.03 | 3.8 | 65 | 10 | 0.059 |
| 14 | 0.06 | 0.06 | 2.0 | 61 | 18 | 0.033 |
| 15 | 0.06 | 0.10 | 1.4 | 63 | 17 | 0.022 |

EXAMPLE 4

A reaction vessel of an inner diameter of 110 mm. and a height of 230 mm. provided with means for agitation by inductive rotation and with a gas outlet tube of 20-mm. inner diameter at its upper flange part was used. A radiation liquid-level gage was installed on the side wall of the reaction vessel to measure liquid levels therewithin.

A catalyst was prepared in accordance with the procedure specified in Example 1 to have a composition such that the Mo/Ni atomic ratio was 0.075, the Ba/Ni atomic ratio was 0.06, and the Ni/(Silica-alumina) ratio by weight was ½.

The above described reaction vessel was charged beforehand with 7 g of the above described catalyst and 1,000 g. of a mixture of 40 mol percent of anhydrous succinic acid and 60 mole percent of gamma-butyrolactone as an initial charge, and reaction was started at a reaction temperature of 260°C and under a reaction pressure of 120 kg/cm².

After the start of reaction, the temperature of the above mentioned gas outlet pipe was maintained at the same 260°C as the reaction temperature, and hydrogen gas was supplied into the reaction vessel at a rate such that the flowrate of the hydrogen gas flowing out of the gas outlet pipe was 1,100 liters/hr. at room temperature and atmospheric pressure.

To prevent lowering of the reaction liquid level due to flowing of the formed product out of the reaction vessel together with the hydrogen gas passing therethrough, starting maleic anhydride was continuously supplied as the liquid level was measured with the radiation liquid-level gage. The maleic anhydride was supplied in a molten state at a temperature of 100°C.

The above described operation was carried out continuously for 24 hours. As a result, the rates at which gamma-butyrolactone and tetrahydrofuran were formed were 90 g./hr. and 18 g/hr., respectively, and their selectivities with respect to the values obtained by deducting the water formed by the reaction from the formed products were 73.3 percent by weight and 14.7 percent by weight, respectively.

Example 5

A reaction was carried out by the procedure of Example 1 except that the flowrate of the hydrogen gas flowing out through the gas outlet pipe was caused to be 1,500 liters/hr. at room temperature and atmospheric pressure. As a result, gamma-butyrolactone and tetrahydrofuran were formed at rates of 150 g/hr. and 18 g./hr., respectively, and their selectivities with respect to the values obtained by deducting the water formed by the reaction from the formed products were 79.1 percent and 9.5 percent, both by weight, respectively.

EXAMPLE 6

A catalyst was prepared by the procedure specified in Example 2 to have a composition such that the Mo/Ni atomic ratio was 0.075, the Tl/Ni atomic ratio was 0.03, and the Ni/(silica-alumina) ratio by weight was 1 : 2.

A reaction was carried out with this catalyst continuously for 24 hours under the same conditions and by the same procedure as those set forth in Example 4 except for the kind of catalyst. As a result, gamma-butyrolactone and tetrahydrofuran were formed at rates of 88 g/hr. and 16 g/hr., respectively, and their selectivities with respect to the values obtained by deducting the water formed by the reaction from the formed products were 79.5 percent and 14.5 percent, both by weight, respectively.

EXAMPLE 7

A reaction was carried out continuously for 24 hours under the same conditions and by the same procedure as those set forth in Example 5 except for the use of the catalyst used in Example 6. As a result, gamma-butyrolactone and tetrahydrofuran were formed at rates of 145 g/hr. and 12 g/hr., respectively, and their selectivities with respect to the values obtained by deducting the water formed by the reaction from the formed products were 87.7 percent and 7.3 percent, both by weight, respectively.

EXAMPLE 8

For the reaction described below, a reaction vessel of an inner diameter of 240 mm and a height of 440 mm provided with induction agitation means was used. This reaction vessel had at its upper part a flange to which an outlet was directly connected for conducting out hydrogen introduced at 80°C into the gaseous phase of the reaction vessel and flowing out together with the formed products.

This reaction vessel was charged beforehand with 110 g. of the catalyst (Mo/Ni atomic ratio 0.075, Tl/Ni atomic ratio 0.03, and Ni/(Silica-alumina) weight ratio 1 : 2) used in Example 6 and 10 kg. of gamma-butyrolactone as an initial charge. For the starting material supplied during the process, at mixture of 85 mole percent of maleic anhydride and 15 mole percent of gamma-bityrolactone was used.

The reaction was carried out continuously under a reaction pressure of 80 kg/cm², with a hydrogen flowrate of from 16 to 18 N cubic meters/hr., and a reaction temperature which was varied so as to regulate the distillation at 1.7 kg/hr.

The reaction conditions with respect to reaction elapsed times and the results obtained at these instants are indicated in Table 4. In Table 4, each value of selectivity is a value corrected by subtracting the quantity of the gamma-butyrolactone contained in the charged starting material from the quantity of gamma-butyrolactone within the distilate liquid.

Table 4.

| Reaction elapsed time (hr.) | Reaction press. (kg/cm²) | Reaction temp. (°C) | Quant. distillate liquid (kg/hr) | Selectivity | | THF/gamma-BL ratio (mole/mole) |
|---|---|---|---|---|---|---|
| | | | | gamma-butyrolactone (mole %) | tetrahydrofuran (mole %) | |
| 250 | 80 | 270 | 1.80 | 89.5 | 3.0 | 0.034 |
| 350 | 80 | 272 | 1.74 | 91.0 | 2.5 | 0.027 |
| 500 | 80 | 275 | 1.72 | 90.5 | 2.4 | 0.027 |
| 600 | 80 | 277 | 1.66 | 91.0 | 2.5 | 0.027 |
| 800 | 80 | 280 | 1.72 | 91.2 | 2.2 | 0.024 |
| 1,000 | 80 | 281 | 1.65 | 91.1 | 2.3 | 0.025 |

We claim:

1. A process for producing gamma-butyrolactone which comprises the step of causing an aliphatic gamma-dicarboxylic compound selected from the group consisting of succinic acid, succinic anhydride, maleic acid and maleic anhydride to contact hydrogen in the presence of a hydrogenation catalyst consisting essentially of a uniform mixture of (1) nickel, (2) molybdenum, and (3) at least one element selected from the group consisting of barium and thallium, wherein the atomic ratio of molybdenum/nickel is from 0.01 to 0.20, and the atomic ratio of element (3)/nickel is from 0.02 to 0.10,
at a temperature of from 180 to 300°C and a pressure of from 30 to 200 atmospheres.

2. A process according to claim 1 wherein the temperature is 230 to 290°C and the pressure is 40 to 140 atmospheres.

3. A process for producing a gamma-butyrolactone as claimed in claim 1 in which the hydrogenation catalyst is prepared by intimately admixing and placing on a carrier a nickel compound which is nickel nitrate, sulfate, chloride or carbonate, a molybdenum compound which is ammonium molybdate or molybdenum oxide, and a nitrate, chloride or carbonate of the element (3) or an oxide thereof and heating in a reducing atmosphere at a temperature of from 350° to 800°C the resulting agglomerate thus combined.

4. A process for producing a gamma-butyrolactone as claimed in claim 3 in which the nickel compound is basic nickel carbonate precipitated from an aqueous solution of the precursor compound thereof, and the molybdenum compound and the compound of the element 3 are admixed in the form of aqueous solutions with this basic nickel carbonate.

5. A process for producing a gamma-butyrolactone as claimed in claim 1 in which the aliphatic gamma-dicarboxylic compound is a member selected from the group consisting of succinic acid, succinic anhydride, and maleic anhydride, and the gamma-butyrolactone is gamma-butyrolactone.

6. A process for producing a gamma-butyrolactone as claimed in claim 1 in which the aliphatic gamma-dicarboxylic compound is a member selected from the group consisting of succinic acid, succinic anhydride, and maleic anhydride, and is introduced into the reaction region in a liquid phase, in which the catalyst is dispersed, and which is maintained at a constant temperature, and the gamma-butyrolactane thus taken out of the reaction region together with an excess of hydrogen gas.

* * * * *